Dec. 17, 1935.   D. EISINGA   2,024,437
WATER HEATER
Filed June 4, 1934
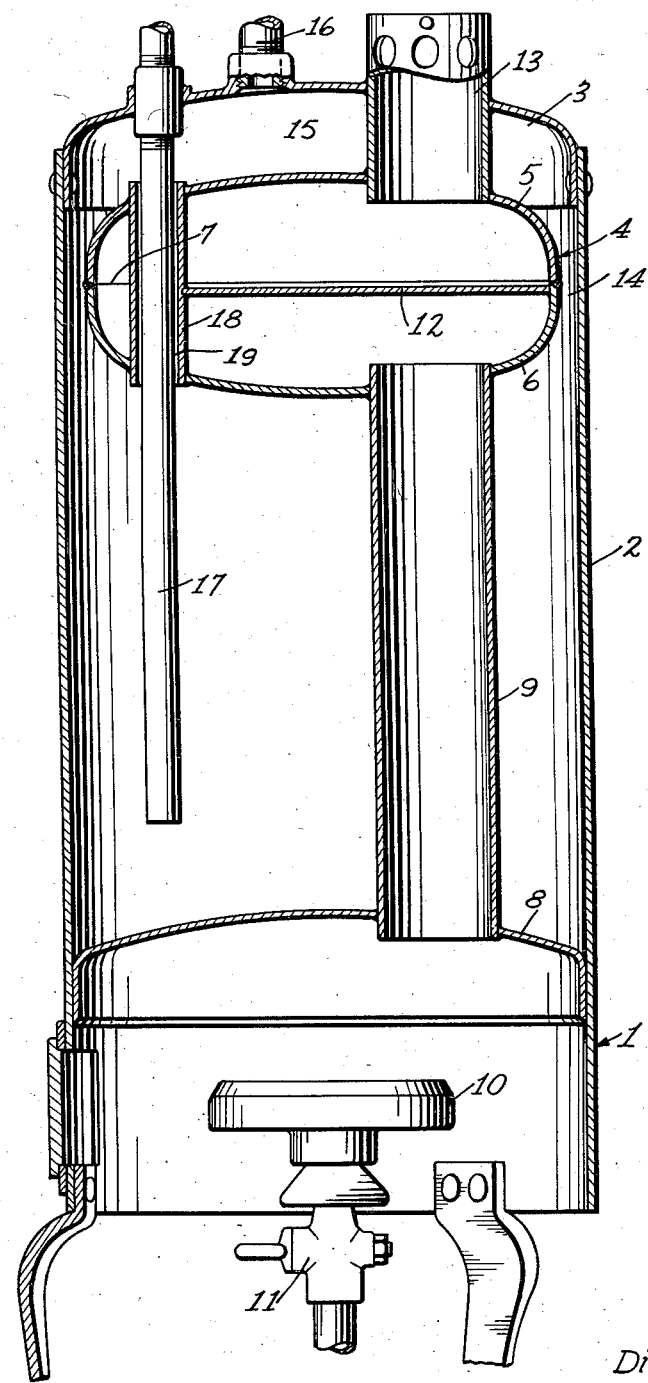
Inventor
Dirk Eisinga
By
Lyon & Lyon
Attorneys Patented Dec. 17, 1935

2,024,437

UNITED STATES PATENT OFFICE 2,024,437

WATER HEATER

Dirk Eisinga, Los Angeles, Calif.

Application June 4, 1934, Serial No. 728,850

2 Claims. (Cl. 122—17)

This invention relates to water heaters and it is particularly applicable to heaters having heating means that is turned on or lighted by hand-control whenever hot water is desired. Heaters of this kind are usually constructed in such a way that when the heating means commences to operate, the entire contents of the tank will have its temperature raised gradually. This gradual rise in temperature is due to the fact that the tank usually has considerable volume. In using heaters of this kind for domestic purposes, the householder sometimes requires a small quantity of hot water immediately, and in order to supply this small quantity of hot water, it should not be necessary to heat up all the water contained in the tank. The general object of this invention is to overcome this difficulty and to provide a tank of simple construction, having means whereby when the heat is turned on, a small quantity of water in the tank will be immediately heated and supplied before substantially raising the temperature of all the water in the tank.

A further object of the invention is to provide a simple construction for a tank, having a heater head located in the interior of the tank and co-operating with the tank walls in such a way as to form a substantially isolated water pocket within the tank, the arrangement of parts being such that when the heat is turned on, the heating head will immediately raise the temperature of the water in the isolated water pocket.

A further object of the invention is to provide means whereby the cold water inlet for the heater may be located in the usual manner without materially interfering with the heating of the water in the isolated pocket.

Further objects of the invention will appear hereinafter.

The invention consists in the novel parts and combination of parts to be described hereinafter, all of which contribute to produce an efficient water heater.

A preferred embodiment of the invention is described in the following specification, while the broad scope of the invention is pointed out in the appended claims.

In the drawing:

The figure is a vertical section through a heater embodying my invention, certain parts being broken away or shown in elevation.

In practicing my invention, I provide heater means preferably in the form of a heating head located in the interior of the tank and at a slight distance from a wall of the tank, so that it co-operates with the walls of the tank to form a substantially isolated water pocket. The water supplied from the heater is drawn directly from this isolated pocket. Although the heating head may be located at any point in the tank, which will enable it to form this isolated water pocket, the heating head is preferably located immediately under the cover wall or head of the heater. Any suitable means may be employed for heating the heating head. In the present specification, I have illustrated a heater of a common type, in which the heating head is heated by the hot gases of combustion from a gas burner. When gas heat is employed in the manner illustrated in the drawing, the construction of the heater should be such as to permit free and unbaffled flow of the gases of combustion to the heating head, but the heating head should be constructed so as to baffle the flow of the gases, and in this way the heater, in operation, tends to produce a high temperature at the heating head immediately. And the heating head is preferably constructed with a relatively large heating area, to which the water in the water pocket is exposed. My improvement is particularly applicable to heaters having tanks, the contents of which is not continuously heated, but in which the heat is turned on by hand whenever hot water is needed.

Referring more particularly to the parts, I indicates a water heater of a common form or type, consisting of an upright cylindrical shell 2, having a cover wall or head 3 at its upper end. In practicing my invention, just below the cover wall 3, I provide a heating head 4, said heating head being of shell-form so as to present a relatively high superficial area. In practice, this heating head is preferably formed of two concavo-convex sections 5 and 6, of sheet metal welded together on their meeting edge 7. Any suitable means may be employed for supplying heat to this heating head. In the present specification, I have illustrated gas heating means. In this type of heater, the tank 1 includes a fire-box head 8, through which a flue 9 extends upwardly through the lower section 6 of the heating head 4. The lower end of the heater is provided with a gas burner 10 having a gas cock 11 that can be turned on when the gas at the burner is to be lighted.

The heating head 4 is preferably provided with means for baffling the flow of gases of combustion, so that when the gas is lighted, this heating head will be immediately heated to a relatively high temperature. In order to accomplish this, the flue 9 is preferably unbaffled, and should be as short as possible so as to conduct the gases of combustion immediately to the heating head in such a way that as little heat as possible is taken from these gases as they pass to the heating head. The flue 9 is preferably disposed toward one side of the tank so as to bring the gases of combustion into the lower section 6 of the heating head toward its side wall, and directly above the flue 9, I provide the heating head 4 with a baffle 12 attached to the adjacent wall and extending over toward the opposite side of the heater. This baffle plate is preferably substantially horizontal, and may be welded to the inner side of the heating head adjacent the welding line 7.

The stack flue 13 is preferably substantially in line with the flue 9. In this way the flow of the hot gases is checked at the heating head 4, and this heating head will immediately heat up to a high temperature when the heater is put into action. The heating head 4 has a considerable outer diameter in a horizontal direction, which is very slightly less than the inner diameter of the cylindrical shell 2. In this way a relatively narrow annular space 14 is left all around the side of the heating head, which cooperates with the upper side of the heating head and with the cover head 3 to form a substantially isolated water pocket 15. The outlet pipe 16 from the heater leads off from this water pocket. In this way, when the heater is turned on, the water in the water pocket 15 will be immediately heated to a higher temperature than the remainder of the water in the tank. Of course, if the heater is left on for any considerable time, all of the water in the tank will have its temperature raised. However, the presence of the isolated pocket 15 will not interfere with the ordinary use of the heater where it is required to deliver a large quantity of water, after the gas burner has been in action a considerable time.

The heating tank is provided with the usual cold water inlet 17, which is a down-pipe passing down through the head 13. However, I prefer to keep the metal wall of this pipe 17 out of contact with the metal walls of the heating head 4. For this purpose I prefer to provide the heating head with a sleeve 18 welded into the same in alignment with the pipe 17. This sleeve is of considerably larger diameter than the water pipe 17, so that an annular space 19 is formed separating the relatively cold wall of the pipe 17 from the sleeve.

What I claim is:

1. A water heater tank for supplying immediately a small quantity of hot water, said tank having a heating head located within the tank near the cover wall of the tank, said heating head and tank walls cooperating to form a substantially isolated water pocket cut off by the heating head from the main portion of the interior of the tank, said water heater having a fire-box at its lower end and having relatively short and substantially straight flue means connecting the fire-box with the interior of said heating head, said flue means and said heating head cooperating to concentrate the heating effect from the gases of combustion passing up the flue, at the said heating head, to raise the temperature of the water in said pocket before substantially raising the temperature of the entire contents of the tank, and an outlet pipe connected to the tank at said isolated pocket only for leading water off from said isolated pocket only.

2. A water heater tank for supplying immediately a small quantity of hot water, said tank having a heating head located within the tank near the cover wall of the tank, said heating head and tank walls cooperating to form a substantially isolated water pocket cut off by the heating head from the main portion of the interior of the tank, said water heater having a fire-box at its lower end and having a single relatively short substantially straight flue connecting the fire-box with the interior of said heating head, said flue and said heating head cooperating to concentrate the heating effect from the gases of combustion passing up the flue, at the said heating head, to raise the temperature of the water in said pocket before substantially raising the temperature of the entire contents of the tank, and an outlet pipe connected to the tank at said isolated pocket only for leading water off from said isolated pocket only.

DIRK EISINGA.